United States Patent
Hashimoto

(10) Patent No.: US 9,906,661 B2
(45) Date of Patent: Feb. 27, 2018

(54) APPARATUS HAVING POWER-SAVING MODE, CONTROL METHOD OF THE APPARATUS, AND STORAGE MEDIUM

(71) Applicant: CANON KABUSHIKI KAISHA, Tokyo (JP)

(72) Inventor: Minoru Hashimoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/281,566

(22) Filed: Sep. 30, 2016

(65) Prior Publication Data
US 2017/0104881 A1    Apr. 13, 2017

(30) Foreign Application Priority Data
Oct. 9, 2015   (JP) .................. 2015-201068

(51) Int. Cl.
| G06F 15/00 | (2006.01) |
| G06F 3/12  | (2006.01) |
| G06K 1/00  | (2006.01) |
| H04N 1/00  | (2006.01) |

(52) U.S. Cl.
CPC ..... *H04N 1/00503* (2013.01); *H04N 1/00896* (2013.01); *H04N 2201/0082* (2013.01)

(58) Field of Classification Search
CPC ........... H04N 1/00503; H04N 1/00896; H04N 2201/0082
USPC .............................. 358/1.14, 1.1, 1.15, 1.13
See application file for complete search history.

(56) References Cited

U.S. PATENT DOCUMENTS

| 2010/0171983 A1* | 7/2010 | Asakawa ........... H04N 1/00408 |
| | | 358/1.15 |
| 2012/0327473 A1* | 12/2012 | Ito ...................... H04N 1/00928 |
| | | 358/1.16 |

FOREIGN PATENT DOCUMENTS

JP     2009-066886 A    4/2009

* cited by examiner

*Primary Examiner* — Douglas Tran
(74) *Attorney, Agent, or Firm* — Fitzpatrick, Cella, Harper & Scinto

(57) ABSTRACT

Contents of a UI screen customized by a user are reflected on a temporary screen that is displayed at the time of return from a power-saving mode. An apparatus having a normal mode and a power-saving mode in which consumed power is less than that in the normal mode as operation modes, including: a display unit; a main control unit configured to cause the display unit to display information; a storage unit configured to store data of an initial screen that is displayed on the display unit at the time of return from the power-saving mode and before initialization processing of the main control unit is completed; a sub control unit configured to, based on the initial screen data stored in the storage unit, cause the display unit to display the initial screen while the initialization processing is proceeding; and a change unit configured to change the initial screen data stored in the storage unit based a change in data of a normal screen to be displayed at the time of return from the power-saving mode.

14 Claims, 7 Drawing Sheets

APPARATUS HAVING POWER-SAVING MODE, CONTROL METHOD OF THE APPARATUS, AND STORAGE MEDIUM

BACKGROUND OF THE INVENTION

Field of the Invention

The present invention relates to a technique to perform display control in accordance with a power state for a display unit included in an image forming apparatus or the like.

Description of the Related Art

It is common for an electronic apparatus (hereinafter, simply called an "apparatus"), such as an image forming apparatus, to include a display unit consisting of an LCD or the like for a user to operate or for displaying various kinds of information. Then, in recent years, high power-saving performance is required and the apparatus is designed so as to immediately make a transition into a power-saving mode in the case where the apparatus is not used for a predetermined period of time. In this power-saving mode, supply of power to each main unit within the apparatus is suspended, and therefore, commonly, the display unit also turns off and is in the state where it cannot be used. In the case where the apparatus is in the power-saving mode, a user returns the apparatus from the power-saving mode by pressing down a power-saving button or the like. At this time, a control unit in charge of controlling the whole of the apparatus generates and outputs a UI screen to be displayed on the display unit, but it takes a certain time until the UI screen is displayed on the display unit. The reason is that the control unit performs initialization processing (startup processing) of the apparatus before starting to generate and output the UI screen. In the case where the turned-off state of the display unit continues despite that a user has operated the power-saving button or the like, the user who desires to use the apparatus will feel anxiety because of not knowing whether returning from the power-saving mode is in progress normally. Consequently, it is important to display the UI screen earlier to eliminate the user's anxiety such as this.

Regarding this point, a technique to produce a temporary display on a display unit during the period of time from when instructions to return from the power-saving mode are given by a user until a control unit starts up and starts outputting a UI screen has been proposed (Japanese Patent Laid-Open No. 2009-66886). In the technique, a sub display controller capable of operating also in the power-saving mode is provided separately from a main display controller. Then, the sub display controller produces a display of "Wait a while" during the period of time from when instructions to return from the power-saving mode are given until the main display controller generates a regular UI screen. Then, at the point in time of generation of the regular UI screen by the main display controller, the display is switched to the regular UI screen. In this case, the sub display controller acquires the data of the temporary display screen from a memory (ROM) and produces a display.

Among image forming apparatuses or the like, there exist some equipped with the function to display a UI screen customized by a user in place of a fixed predetermined UI screen. The customization function is a function that enables a user to arbitrarily change and set the item to be displayed on the UI screen, the character size, the color, etc., so that usability is improved. In the apparatus equipped with the customization function such as this, it is desirable to reflect the customized contents also on the temporary screen that is displayed at the time of return from the power-saving mode. The reason is that in the case where the temporary screen that is displayed immediately after the return from the power-saving mode differs from the regular customized UI screen that is displayed after this, a user is caused to have a feeling of difference. However, according to the technique in the above-described Japanese Patent Laid-Open No. 2009-66886, the display screen prepared in advance and stored in the ROM is just displayed. The timing to customize the UI screen can be arbitrary and the contents thereof can be different for each user, and therefore, it is difficult to prepare in advance the display screen corresponding to the customized UI screen each time.

SUMMARY OF THE INVENTION

The apparatus according to the present invention is an apparatus having a normal mode and a power-saving mode in which consumed power is less than that in the normal operation mode as operation modes, and includes: a display unit; a main control unit configured to cause the display unit to display information; a storage unit configured to store data of an initial screen that is displayed on the display unit at the time of return from the power-saving mode and before initialization processing of the main control unit is completed; a sub control unit configured to, based on the initial screen data stored in the storage unit, cause the display unit to display the initial screen while the initialization processing is proceeding; and a change unit configured to change the initial screen data stored in the storage unit based on a change in data of a normal screen to be displayed at the time of return from the power-saving mode.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
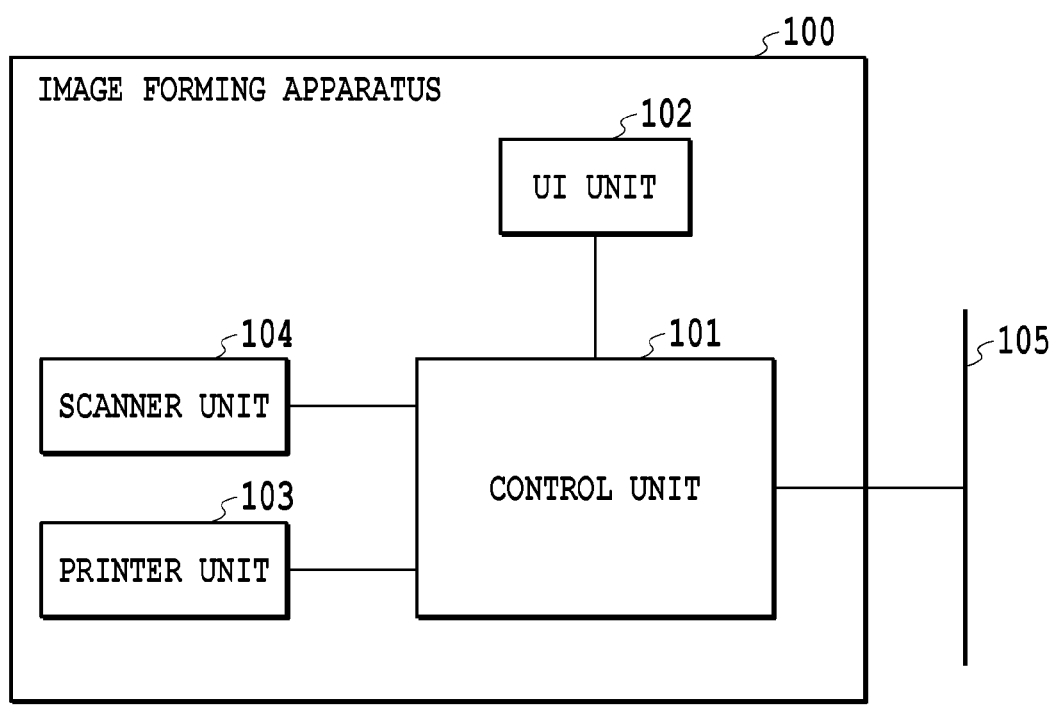
FIG. 1 is a block diagram showing an example of a configuration of an image forming apparatus.

FIG. 1 is a block diagram showing an example of a configuration of an image forming apparatus as an electronic apparatus equipped with a power-saving mode according to the present embodiment. An image forming apparatus 100 includes a control unit 101, a user interface unit (UI unit) 102, a printer unit 103, and a scanner unit 104 and these units are connected to a network 105.

The control unit 101 centralizedly controls each unit of the image forming apparatus 100. The UI unit 102 includes buttons for a user to perform various operations and a display unit (e.g., LCD) for displaying various kinds of information. The printer unit 103 prints and outputs various kinds of image data for which processing has been performed by the control unit 101. The scanner unit 104 scans a document set on a document table or the like, not shown, to generate image data and inputs the image data to the control unit 101. In the present embodiment, the network 105 is supposed to be a LAN.

Figure 2:
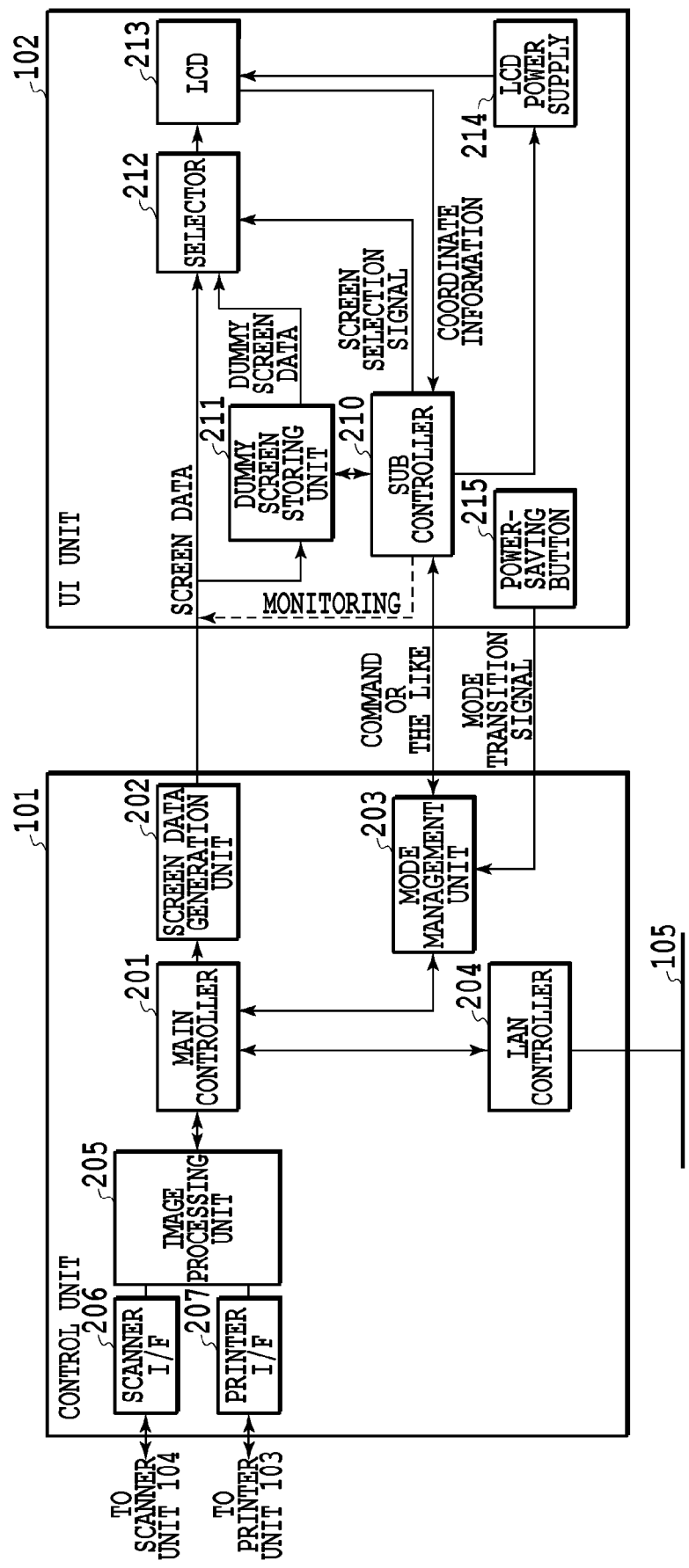
FIG. 2 is a diagram showing internal configurations of a control unit and a UI unit configuring the image forming apparatus.

Next, with reference to FIG. 2, the internal configurations of the control unit 101 and the UI unit 102 configuring the image forming apparatus 100 are explained in detail.

First, the control unit 101 is explained. A main controller (main control unit) 201 includes a CPU, which is a central processing unit, a ROM that stores various programs or the like, a RAM that functions as a work area of the CPU, etc. The main controller 201 controls each unit within the control unit 101 in accordance with predetermined programs. A screen data generation unit 202 generates three kinds of screen that are displayed on a display unit, specifically, a normal screen, a power-saving mode transition screen, and a dummy screen. The normal screen is a regular UI screen on which it is possible to receive user operations, such as an operation to input information and an operation to select a button, in the normal mode. The power-saving mode transition screen is a screen that indicates that processing to make a transition into the power-saving mode is in progress. The dummy screen is a screen (initial screen) that is displayed until the normal screen is displayed at the time of return from the power-saving mode, which is generated based on the above-described normal screen, and on which a user cannot perform any operation. The screen data generation unit 202 generates data of each screen described above and outputs the data to the UI unit 102. A mode management unit 203 performs intermediation of various commands with the UI unit 102, in addition to operation mode switching control, such as control to make a transition from the normal mode into the power-saving mode and control to return from the power-saving mode to the normal mode. A LAN controller 204 communicates with an apparatus (not shown) connected with the network 105 under the control of the main controller 201. An image processing unit 205 performs various kinds of image processing for the input image data and outputs the image data after the processing to the printer unit 103. A scanner I/F 206 is an interface with the scanner unit 104 and takes in image data generated by a scan to the control unit 101. A printer I/F 207 is an interface with the printer unit 103 and outputs image data for which processing has been performed by the image processing unit 205 to the printer unit 103.

Next, the UI unit 102 is explained. A sub controller (sub control unit) 210 includes a CPU that consumes small power or the like and controls each unit within the UI unit 102 based on the various commands from the main controller 201. A dummy screen storing unit 211 internally includes a memory and stores and outputs data of a dummy screen that is displayed at the time of return from the power-saving mode under the control of the sub controller 210. The memory within the dummy screen storing unit 211 is a nonvolatile memory and data within the memory is held also during the period of time during which the operation mode is the power-saving mode and the supply of power is suspended. Further, the sub controller 210 monitors the start of output of the normal screen data by the screen data generation unit 202 and performs switching control of a screen selection signal, to be described later. Whether or not the screen data generation unit 202 is outputting the normal screen data can be determined by, for example, detecting a change in the level of a signal that is output by the screen data generation unit 202. On detecting the output of the normal screen data at the time of return from the power-saving mode, the sub controller 210 switches the screen selection signals to cause a selector 212 to output dummy screen data. The selector 212 selectively outputs image data from one of a plurality of input sources of screen data (here, the screen data generation unit 202 and the dummy screen storing unit 211) to an LCD 213 in accordance with the screen selection signal from the sub controller 210. The LCD 213 has a touch panel function and outputs information on the coordinates of a position touched by the fingertip of a user to the sub controller 210 while producing a transmissive display of information on the screen. This coordinate information is transmitted from the sub controller 210 to the main controller 201 via the mode management unit 203 and is subjected to processing in the main controller 201. For example, in the case where a figure in the shape of a button is displayed on the LCD 213 and the coordinates corresponding to the figure are input to the main controller 201, it is possible to cause the operation to be performed as if the button were pressed down. An LCD power source 214 supplies power to light up a backlight of the LCD 213 in accordance with the control of the sub controller 210.

Figure 3:
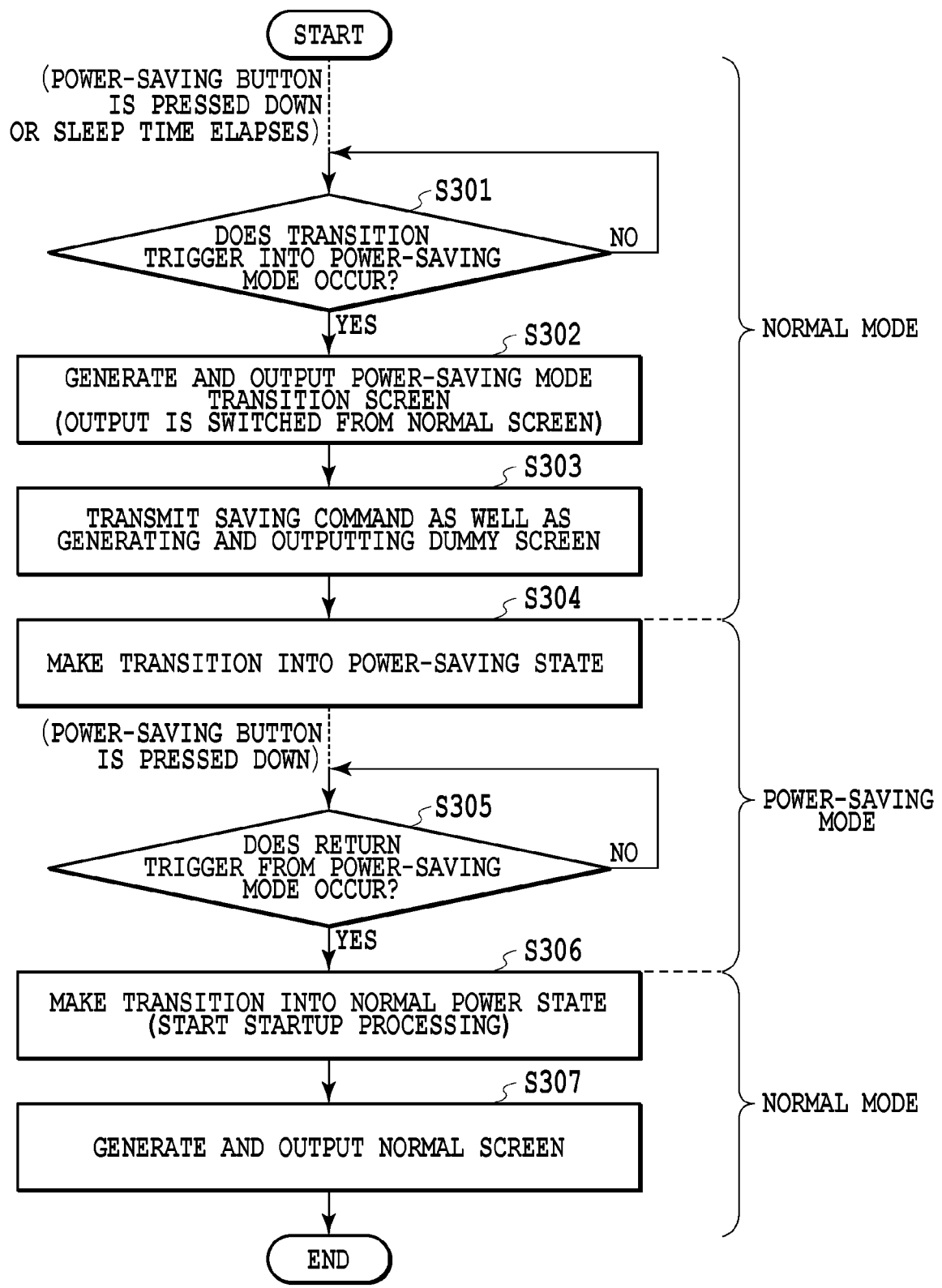
FIG. 3 is a flowchart showing a flow of operation mode transition control of the control unit according to a first embodiment.

Subsequently, operation mode transition control in the control unit 101 is explained. FIG. 3 is a flowchart showing a flow of the operation mode transition control of the control unit 101 according to the present embodiment. The series of processing is implemented by the CPU within the main controller 201 reading a predetermined program stored in the ROM, developing the program onto the RAM, and executing the program. The operation mode transition control processing of the control unit 101 shown by the flow in FIG. 3 is started in the normal mode state where the image forming apparatus 100 has already been turned on and power has been supplied to each main unit.

The state at step 301 is a state where the main controller 201 stands by for occurrence a transition trigger into the power-saving mode. For example, in the case where a mode transition signal is input to the mode management unit 203 by a user pressing down a power-saving button 215 and this signal is transmitted to the main controller 201, a transition trigger occurs. Besides this, it may also be possible to cause a transition trigger to occur in the case where a user operation does not continue for a fixed period of time (sleep function). In the case where the occurrence of a transition trigger is detected, the processing proceeds to step 302.

At step 302, the main controller 201 gives instructions to generate and output a power-saving mode transition screen to the screen data generation unit 202. Upon receipt of the instructions, the screen data generation unit 202 generates a power-saving mode transition screen and outputs power-saving mode transition screen data to the UI unit 102 (selector 212). As a power-saving mode transition screen, mention is made of a screen obtained by graying out the normal screen, a screen on which a message indicating that the power-saving mode transition processing is in progress is displayed, etc. At this time, the sub controller 210 does not switch the screen selection signals. That is, the target of output of the selector 212 remains the screen data generation unit 202 side and by the output contents switching from the previous normal screen data to the power-saving mode transition screen data, the power-saving mode transition screen is displayed on the LCD 213 as a result.

Figure 4A:
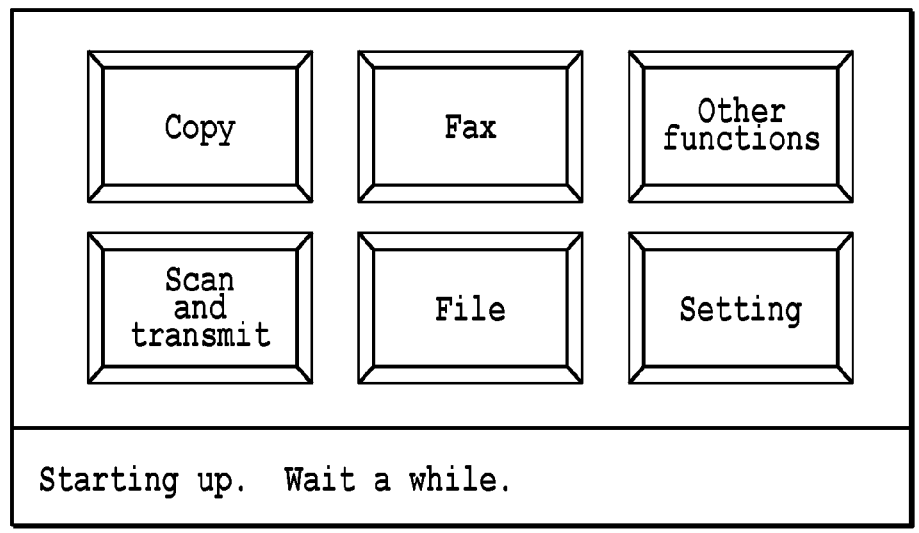
FIGS. 4A to 4C are diagrams showing examples of dummy screens.
Figure 4B:
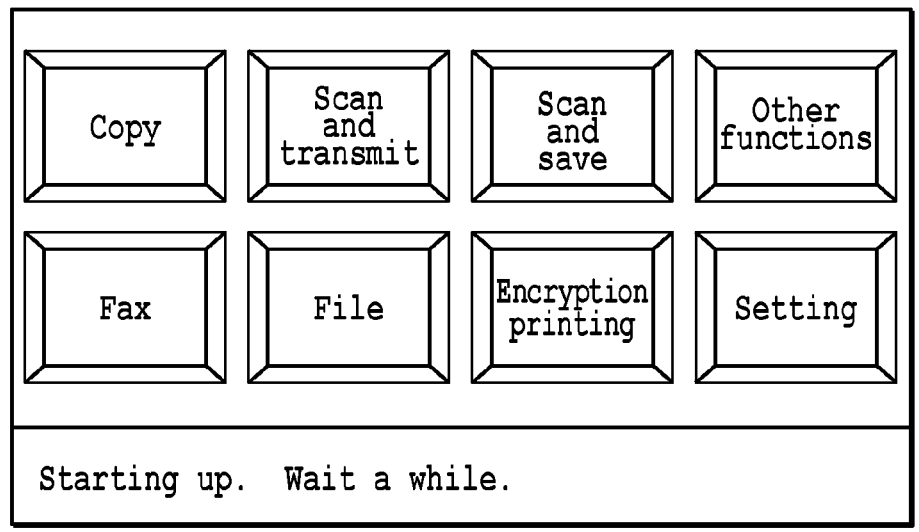
Figure 4C:
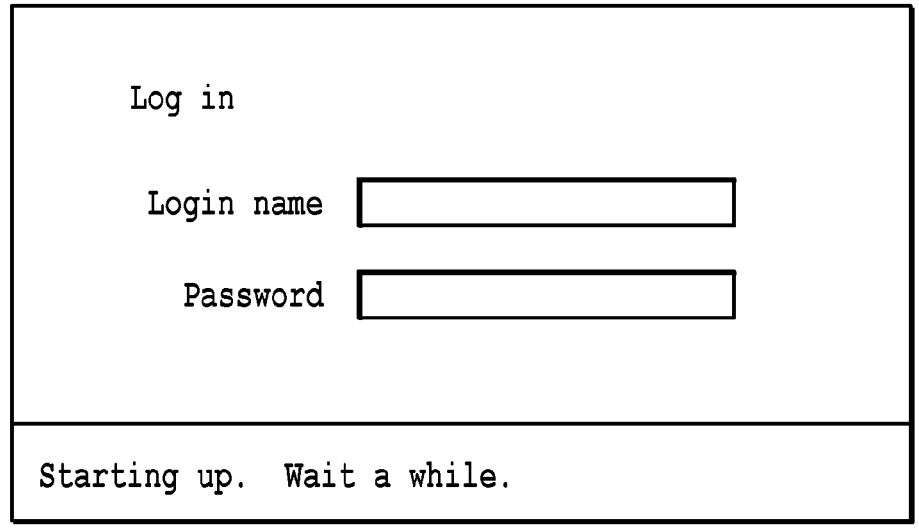

At step 303, the main controller 201 gives instructions to generate and output a dummy screen (initial screen) to the screen data generation unit 202. Upon receipt of the instructions, the screen data generation unit 202 generates a dummy screen by referring to the contents of the UI screen setting. Here, the UI screen setting is the setting to specify the contents of the normal screen and for example, it is possible to set a login screen to prompt user authentication, besides a screen obtained by customizing the default normal screen. Unless specified in particular, the contents of the screen are those set at the time of shipment or the like (default screen). FIG. 4A to FIG. 4C are diagrams showing examples of dummy screens generated at this step and FIG. 4A shows a dummy screen of the default screen, FIG. 4B shows a dummy screen of the customized normal screen, and FIG. 4C shows a dummy screen of the login screen, respectively. On the default screen on which FIG. 4A is based, six buttons to select a function are arranged. On the customized normal screen on which FIG. 4B is based, eight buttons to select a function are arranged and the number of buttons and the order of arrangement are customized for easy-to-use. On the login screen on which FIG. 4C is based, there are boxes to which a login name and a password are input, respectively. In the case where the login function is set effective in advance, the login screen is displayed at the time of startup of the apparatus or at the time of return from the power-saving mode and it is possible to limit users who can use the apparatus. The difference between the dummy screen shown in each of FIG. 4A to FIG. 4C and each screen on which each dummy screen is based is that a message "Now starting up. Wait a while" indicating that the return processing from the power-saving mode is in progress is displayed at the lower portion of the screen. In the case where generation of a dummy screen is completed, the screen data generation unit 202 outputs the dummy screen data to the UI unit 102 (selector 212). Further, the main controller 201 transmits a command of instructions to save the dummy screen data (hereinafter, a saving command) along with instructions to generate and output a dummy screen to the sub controller 210 via the mode management unit 203. Due to the saving command, the sub controller 210 grasps the output timing of the dummy screen data by the screen data generation unit 202 and gives instructions to acquire and save the dummy screen data to the dummy screen storing unit 211.

At step 304, the main controller 201 gives instructions to make a transition from the normal mode into the power-saving mode to the mode management unit 203. Upon receipt of the transition instructions, the mode management unit 203 suspends supply of power to each function unit except for the function units that require the power source even in the power-saving mode. In the present embodiment, the function units that require the power source even in the power-saving mode are a detection circuit that detects a mode transition signal that serves as a return trigger, a circuit to turn on the power source at the time of detection of the return trigger, and the power-saving button 215. By the mode management unit 203 suspending supply of power, the image forming apparatus 100 makes a transition into the power-saving mode (power-saving state) where power to be supplied is reduced than that in the normal operation mode.

After this, in the case where the mode transition signal that serves as a return trigger is detected in the power-saving mode, the processing to return from the power-saving mode is started. Specifically, the processing is as follows.

The state at step 305 is a state where the main controller 201 stands by for occurrence of the return trigger from the power-saving mode. In the case where the power-saving button 215 is pressed down by a user, the mode transition signal that serves as a return trigger is input to the mode management unit 203, and the mode transition signal is transmitted to the main controller 201, the processing proceeds to step 306.

At step 306, the processing to return from the power-saving mode (processing to make a transition into the normal mode) is performed. Specifically, the supply of power to each main unit, which has been suspended by the mode management unit 203, is resumed. Then, the initialization processing (startup processing) is started in the main controller 201. The time taken for the initialization processing is, for example, about several seconds. In the meanwhile, a user cannot operate the apparatus and is obliged to wait, but in the present embodiment, the dummy screen is displayed on the LCD 213, and therefore, it is possible for a user to grasp that the return processing is in progress.

At step 307, the main controller 201 having completed the initialization processing gives instructions to generate and output the normal screen to the screen data generation unit 202. Upon receipt of the instructions, the screen data generation unit 202 generates the normal screen based on the UI screen setting described previously and outputs the normal screen data to the UI unit 102 (selector 212). Due to this, the normal screen is displayed on the LCD 213. At this point in time, the entire return processing is completed and a state is brought about where the touch panel operation is also possible.

The above is the contents of the operation mode transition control in the control unit 101.

Figure 5:
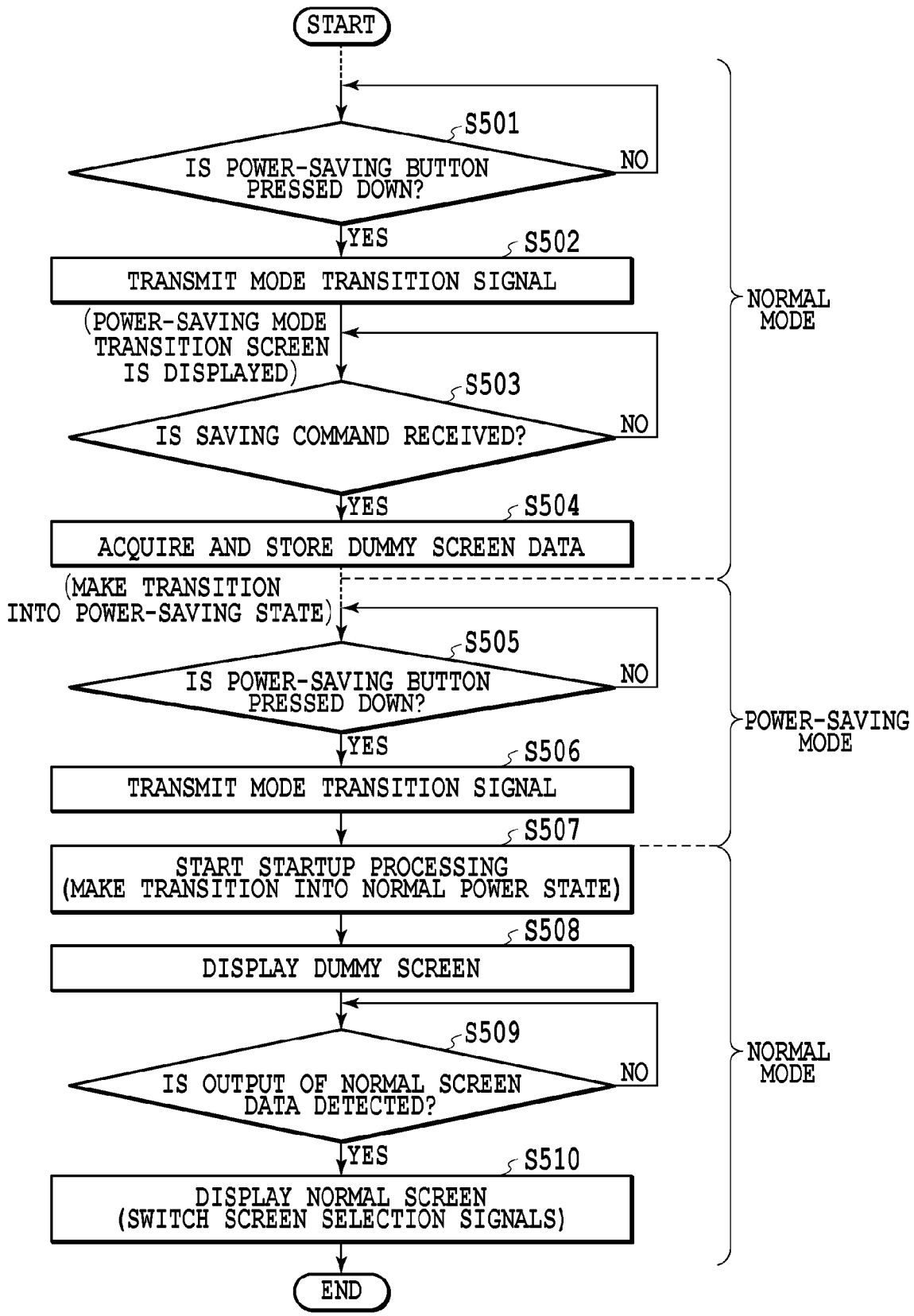
FIG. 5 is a flowchart showing a flow of operation mode transition control of the UI unit according to the first embodiment.

Subsequently, the operation mode transition control in the UI unit 102 is explained. FIG. 5 is a flowchart showing a flow of the operation mode transition control of the UI unit 102 according to the present embodiment. The series of processing is implemented basically by the CPU within the sub controller 210 executing a predetermined program as in the flow in FIG. 3, but part of the processing is performed without involving the sub controller 210. In correspondence to the flow in FIG. 3, it is also assumed that the operation mode transition control processing of the UI unit 102 is started in the normal mode state where the image forming apparatus 100 has already been turned on and power has already been supplied to each main unit.

The state at step 501 is a standby state of awaiting a user pressing down the power-saving button 215. In the case where the pressing-down of the power-saving button 215 is detected, the processing proceeds to step 502.

At step 502, in response to the pressing-down of the power-saving button 215, the mode transition signal that serves as a transition trigger into the power-saving mode is sent to the main controller 201 via the mode management unit 203. The sub controller 210 is not involved in the detection of the pressing-down of the power-saving button 215 and the transmission of the mode transition signal in response thereto.

The state at step 503 is a state where the sub controller 210 stands by for reception of the dummy screen data saving command. In the stage where the saving command is received from the main controller 201, the processing proceeds to step 504. As described previously, prior to the reception of the saving command, in the control unit 101, the processing to make a transition into the power-saving mode has already been started in response to the mode transition signal. Consequently, at the point in time of confirmation of the reception at this step, the power-saving mode transition screen is displayed on the LCD 213 by the execution at step 302 described previously.

At step 504, the sub controller 210 gives instructions to acquire and save the dummy screen data to the dummy screen storing unit 211 in accordance with the received saving command. Upon receipt of the instructions, the dummy screen storing unit 211 acquires the dummy screen data being output toward the selector 212 from the screen data generation unit 202 and stores the data within a memory, not shown. After this, the supply of power to each unit (except for the power-saving button 215) within the UI unit 102 is suspended by the mode management unit 203 of the control unit 101 and the state of the power-saving mode is brought about (step 304 described previously). At the point in time of this step, the mode is still the normal mode and the state is where the selector 212 is outputting the image data provided by the screen data generation unit 202 (the screen data generation unit side is selected as the target of output by the image selection signal). Consequently, at the point in time of the screen data generation unit 202 starting to output the dummy screen data in place of the power-saving mode transition screen data, the dummy screen data is displayed on the LCD 213. The processing regarding this point will be explained in the second embodiment.

The state at step 505 is a standby state of awaiting a user pressing down the power-saving button 215. In the case where the pressing-down of the power-saving button 215 is detected, the processing proceeds to step 506.

At step 506, in response to the pressing-down of the power-saving button 215, the mode transition signal that serves as a return trigger from the power-saving mode is sent to the main controller 201 via the mode management unit 203.

After this, in the case where the supply of power to each unit within the UI unit 102 is resumed by the mode management unit 203, at step 507, the sub controller 210 starts initialization processing (startup processing). The circuit scale of the sub controller 210 is small compared to that of the main controller 201, and therefore, the time necessary for initialization may be much short compared to the time necessary for initialization of the main controller 201, and for example, about several ms to several tens of ms.

After the initialization processing is completed, at step 508, the sub controller 210 issues a screen selection signal, with the dummy screen storing unit 211 side as the target of output, to the selector 212 as well as giving instructions to output dummy screen data to the dummy screen storing unit 211. Due to this, the dummy screen storing unit 211 reads the dummy screen data from the internal memory and outputs the dummy screen data to the selector 212, and the selector 212 outputs the dummy screen data provided by the dummy screen storing unit 211 in accordance with the image selection signal. In this manner, the dummy screen is displayed on the LCD 213, and therefore, it is possible for a user to grasp that the apparatus is normally starting up. Further, in the case where a user has customized (changed) the UI screen, the dummy screen displayed at this time will be a screen on which the contents of the customization are reflected. Because of this, although the apparatus is not operable in this stage, it is possible for a user to check which part to operate in order to cause the apparatus to operate a desired operation while standing by for return, and therefore, it is possible to start a desired operation immediately after the touch panel becomes operable. Consequently, it is possible for a user to make use of the apparatus without having a feeling of difference, which is caused by the dummy screen displayed on the LCD 213 differing from the normal screen, during the period of time of return from the power-saving mode to the normal mode.

The state at step 509 is a state where the sub controller 210 is monitoring the start of output of the normal screen data from the screen data generation unit 202 after the initialization processing of the main controller 201 is completed. In the case where the start of output of the normal screen data is detected, the processing proceeds to step 510.

At step 510, the sub controller 210 issues a screen selection signal, with the screen data generation unit 202 side as the target of output, to the selector 212. Due to this screen selection signal, the normal screen data is output from the selector 212 in place of the dummy screen data and the normal screen is displayed on the LCD 213. Due to this, a user grasps that the apparatus has become operable. The above is the contents of the operation mode transition control in the UI unit 102.

The control at the time of return from the power-saving mode in the image forming apparatus 100 according to the present embodiment is summarized with the passage of time as follows.

1) First, by pressing down the power-saving button 215, the supply of power to the units to which power has not been supplied because of the power-saving mode is resumed and the initialization processing of the main controller 201 starts. Until this initialization processing is completed, the normal screen data is not output from the screen data generation unit 202.

2) On the other hand, due to the resumption of the supply of power, the sub controller 210 displays the dummy screen held in advance on the LCD 213 in the stage before the initialization processing of the main controller 201 is completed. The data of the dummy screen that is displayed at this time is data generated by the screen data generation unit 202 under the control of the main controller 201 by taking into consideration the contents of the UI screen setting immediately before the transition into the power-saving mode.

3) After the initialization processing of the main controller 201 is completed and the screen data generation unit 202 starts output of the normal screen data, the sub controller 210 detects this and switches the screen selection signals. Due to this, the normal screen data is output from the selector 212 in place of the dummy screen data and on the LCD 213, the normal screen is displayed. In this manner, the return from the power-saving mode is completed and it is made possible for a user to make use of the apparatus.

In the present embodiment, as the dummy screen of the regular UI screen, the screen to which the message indicating that the return processing is in progress is added is used. However, the aspect of the dummy screen is not limited to this. For example, it may also be possible to use, based on the customized normal screen, a screen on which each button within the normal screen is displayed in the grayed-out state, a screen on which each button within the normal screen is omitted so that only the color of the background remains, a screen the resolution of which is considerably reduced, etc., as the dummy screen.

According to the present embodiment, it is possible to cause the dummy screen (initial screen) that is displayed on the display unit, such as an LCD, at the time of return from the power-saving mode to correspond to the contents of the UI screen customized by a user taking usability into consideration. Due to this, also in the case where the return processing is completed and the display on the display unit changes from the dummy screen (initial screen) into the normal screen, it is made possible for a user to use the apparatus without having a feeling of difference.

Second Embodiment

In the first embodiment, in the case where the transition trigger into the power-saving mode is issued, the LCD 213 continues to produce a display. Because of this, the dummy screen (initial screen) data output from the screen data generation unit 202 is not only saved in the dummy screen storing unit 211 but also displayed on the LCD unit although the period of time of the display is short. Consequently, an aspect is explained as a second embodiment in which the backlight of the LCD 213 is turned off before the dummy screen data is output from the screen data generation unit 202 so that the dummy screen (initial screen) is not displayed. Explanation of the portions in common to those of the first embodiment is omitted or simplified and in the following, different points are explained mainly.

Figure 6:
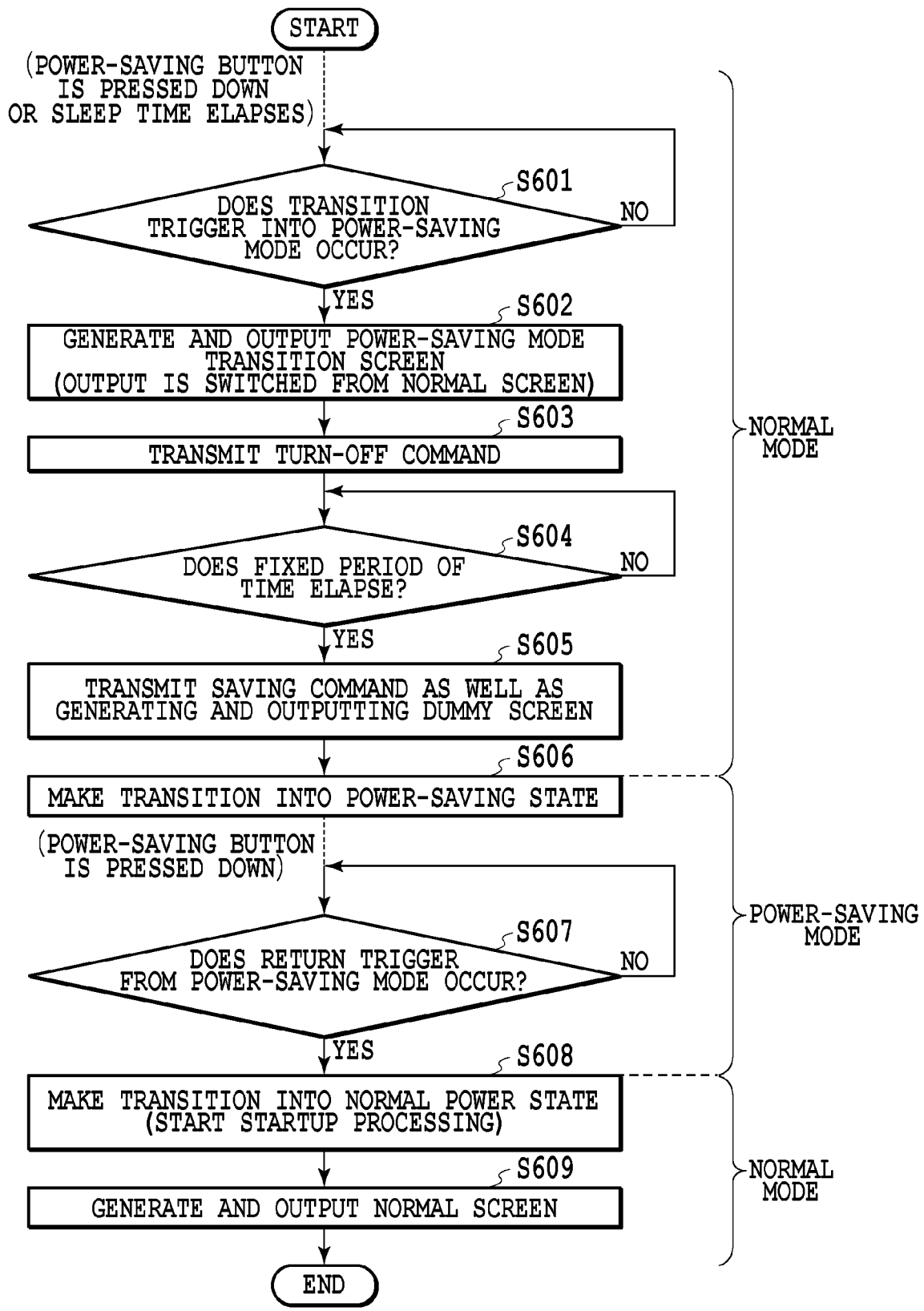
FIG. 6 is a flowchart showing a flow of operation mode transition control of a control unit according to a second embodiment.

FIG. 6 is a flowchart showing a flow of operation mode transition control of the control unit 101 according to the present embodiment.

Steps 601 and 602 correspond to steps 301 and 302, respectively, of the flow in FIG. 3 according to the first embodiment. That is, in the case where the main controller 201 detects the occurrence of the transition trigger into the power-saving mode (Yes at S601), instructions to generate and output the power-saving mode transition screen are given to the screen data generation unit 202 (S602). Upon receipt of the instructions, the screen data generation unit 202 generates the power-saving mode transition screen and outputs the data to the UI unit 102 (selector 212). Due to this, on the LCD unit 213, the power-saving mode transition screen is displayed.

At step 603, the main controller 201 transmits instructions to turn off the LCD 213 (turn-off command) to the sub controller 210 via the mode management unit 203. At this time, measurement of a fixed period of time that is set in advance is also started. The fixed period of time is set to a period of time sufficient for the UI unit 102 to turn off the backlight (e.g., several hundred msec). By issuing the saving command of the dummy screen data after the fixed period of time elapses, the LCD 213 has already been turned off in the case where the screen data generation unit 202 starts generating and outputting the dummy screen data, and therefore, the dummy screen is no longer displayed even in the case where the screen selection signal remains unchanged.

At step 604, the main controller 201 determines whether the fixed period of time for which measurement is started at step 602 has elapsed. In the case where the fixed period of time has elapsed, the processing proceeds to step 605.

Step 605 corresponds to step 303 of the flow in FIG. 3. That is, the main controller 201 transmits the saving command of the dummy screen data toward the sub controller 210 as well as giving instructions to generate and output the dummy screen to the screen data generation unit 202. Due to the instructions, the screen data generation unit 202 generates and outputs the dummy screen and further, in the UI unit 102, the dummy screen data is acquired and saved by the dummy screen storing unit 211.

Step 606 corresponds to step 304 of the flow in FIG. 3. That is, the transition into the power-saving state is made by the mode management unit 203 having received the instructions to make a transition into the power-saving mode from the main controller 201. Each of step 606 and subsequent steps relating to the return from the power-saving is the same as that of the first embodiment, and therefore, explanation is omitted.

The above is the contents of the operation mode transition control of the control unit 101 according to the present embodiment.

Figure 7:
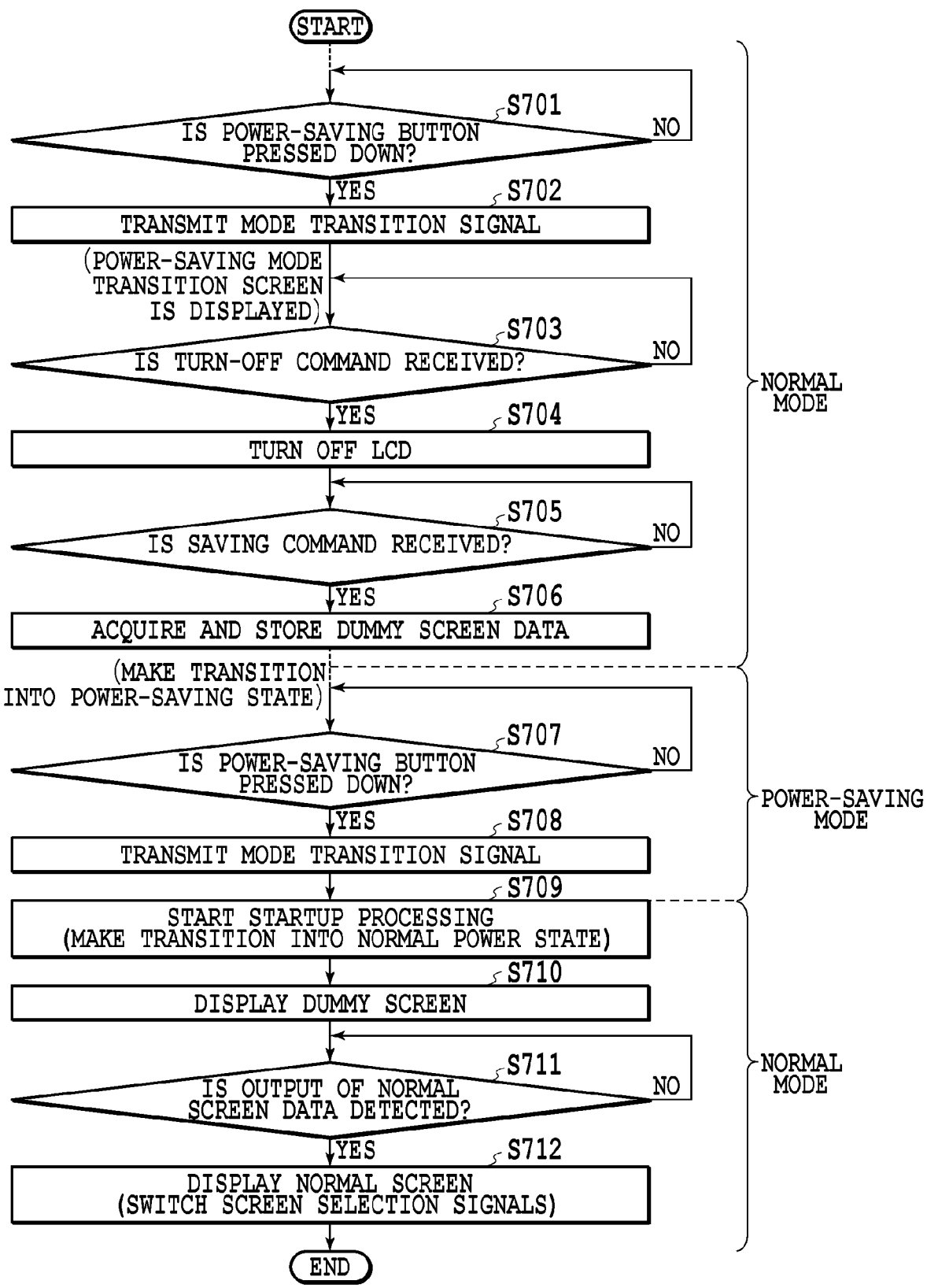
FIG. 7 is a flowchart showing a flow of operation mode transition control of a UI unit according to the second embodiment.

FIG. 7 is a flowchart showing a flow of the operation mode transition control of the UI unit 102 according to the present embodiment.

Steps 701 and 702 correspond to steps 501 and 502, respectively, of the flow in FIG. 5 according to the first embodiment. That is, the state is a state of awaiting a user pressing down the power-saving button 215. In the case where the pressing-down of the power-saving button 215 is detected, the processing proceeds to step 702.

At step 702, in response to the pressing-down of the power-saving button 215, the mode transition signal that serves as the transition trigger into the power-saving mode is sent to the main controller 201 via the mode management unit 203.

The state at step 703 is a state where the sub controller 210 stands by for reception of the turn-off command of the LCD 213. In the stage where the turn-off command is received from the main controller 201, the processing proceeds to step 704. As in the first embodiment, in the control unit 101, the processing to make a transition into the power-saving mode has already been started in response to the above-described mode transition signal. Consequently, at the point in time of confirmation of reception of the turn-off command at this step, on the LCD 213, the power-saving mode transition screen is displayed by the execution at step 602 described previously.

At step 704, the sub controller 210 controls the LCD power source 214 and suspends the supply of power to the backlight circuit of the LCD 213. Due to this, the LCD 213 turns off.

Steps 705 and 706 correspond to steps 503 and 504, respectively, of the flow in FIG. 5. That is, in the stage where the saving command is received from the main controller 201, the processing proceeds to step 706 (Yes at S705) and the sub controller 210 gives instructions to acquire and save the dummy screen data to the dummy screen storing unit 211 in accordance with the saving command. Upon receipt of the instructions, the dummy screen storing unit 211 acquires the dummy screen data being output from the screen data generation unit 202 toward the selector 212 and stores the dummy screen data within the memory, not shown. At this time, the backlight of the LCD 213 is turned off at step 704 described above, and therefore, even in the case where the dummy screen data is output from the screen data generation unit 202, the dummy screen is not displayed on the LCD 213. After this, by the mode management unit 203 of the control unit 101, the supply of power to each unit (except for the power-saving button 215) within the UI unit 102 is suspended and the power-saving state is brought about.

Each of step 707 and subsequent steps relating to the return from the power-saving mode is the same as that of the first embodiment, and therefore, explanation is omitted.

The above is the contents of the operation mode transition control of the UI unit 102 according to the present embodiment.

In the present embodiment, at the unnatural timing of the power-saving mode transition, the backlight is turned off so that the dummy screen is not displayed on the LCD 213. However, the purpose of this is to prevent a user from noticing unnaturalness, and therefore, for example, it may also be possible to display a predetermined substitute screen including a single color, such as black, which is, for example, saved separately, by switching the target of output of the selector 212 to the dummy screen storing unit 211 side. Alternatively, it may also be possible to suspend the supply of power to the LCD 213 itself.

According to the present embodiment, in the case where the dummy screen (initial screen) data is saved, the dummy screen (initial screen) is not displayed on the display unit of the image forming apparatus, and therefore, there is no possibility of giving a user the impression of unnaturalness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reflect the contents of the UI screen customized by a user on the temporary screen that is displayed at the time of return from the power-saving mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201068, filed Oct. 9, 2015, which is hereby incorporated by reference wherein in its entirety.

What is claimed is:
1. An apparatus having, as operation modes, a normal mode and a power-saving mode in which consumed power is less than that in the normal mode, the apparatus comprising:
   a display unit;
   a main control unit that transmits display information to the display unit;
   a storage unit that stores data of an initial screen that is displayed on the display unit;
   a sub control unit that transmits the initial screen data stored in the storage unit to the display unit at least during starting of the main control unit; and
   a change unit that transmits a change instruction to change the initial screen data stored in the storage unit into new initial screen data, based on a change of a screen to be displayed at the time of return from the power-saving mode.

2. The apparatus according to claim 1, wherein the main control unit transmits the new initial screen data, and
   wherein the storage unit stores the new initial screen data in accordance with the change instruction transmitted from the change unit.

3. The apparatus according to claim 2, wherein the change unit transmits, at the time of transition into the power-saving mode, the change instruction.

4. The apparatus according to claim 2, further comprising:
   a selector unit that outputs one of image data that is input from the main control unit and image data that is stored in the storage unit to the display unit in accordance with a screen selection signal that is input from the sub control unit.

5. The apparatus according to claim 4, wherein upon detecting that screen data is output from the main control unit, the sub control unit performs control to switch the screen selection signals for the selector unit so that the image data from the main control unit is output.

6. The apparatus according to claim 2, wherein the sub control unit performs control so that a new initial screen is not displayed on the display unit when the storage unit stores the new initial screen data.

7. The apparatus according to claim 6, wherein the main control unit transmits a turn-off instruction to turn off the display unit before transmitting the change instruction.

8. The apparatus according to claim 7, wherein the change unit transmits the change instruction on the basis of a lapse of a fixed time that is set in advance after giving the turn-off instruction.

9. The apparatus according to claim 6, wherein the sub control unit performs control so that the new initial screen is not displayed by causing the display unit to display a predetermined substitute screen when the new initial screen data is stored in the storage unit.

10. The apparatus according to claim 1, wherein a starting time period of the sub control unit is shorter than a starting time period of the main control unit.

11. The apparatus according to claim 1, wherein the second control unit does not change the initial screen even if a user operation for the initial screen is received.

12. The apparatus according to claim 11, wherein the initial screen is any one of a screen to which a message indicating that processing to return from a power-saving mode is in progress is attached to the normal screen, a screen on which each button of the normal screen is displayed in the grayed-out state, a screen on which each button of the normal screen is omitted so that only the color of the background remains, and a screen of which the resolution of the normal screen is reduced.

13. A control method of an apparatus having, as operation modes, a normal mode and a power-saving mode in which consumed power is less than that in the normal mode, and including a display unit, a main control unit that causes the display unit to display information, and a sub control unit, the control method comprising the steps of:
   storing, in a storage unit, data of an initial screen that is displayed on the display unit at the time of return from the power-saving mode;

transmitting, from the sub control unit to the display unit, the initial screen based on the initial screen data stored in the storage unit at least during starting of the main control unit; and changing, by the main control unit, the initial screen data stored in the storage unit into new initial screen data based on a change of a screen to be displayed at the time of return from the power-saving mode.

14. A non-transitory computer-readable storage medium storing a program for causing a computer to perform a control method of an apparatus having, as operation modes, a normal mode and a power-saving mode in which consumed power is less than that in the normal mode, and including a display unit, a main control unit that causes the display unit to display information, and a sub control unit, the control method comprising the steps of:

storing, in a storage unit, data of an initial screen that is displayed on the display unit at the time of return from the power-saving mode;

transmitting, from the sub control unit to the display unit, the initial screen based on the initial screen data stored in the storage unit at least during starting of the main control unit; and changing, by the main control unit, the initial screen data stored in the storage unit into new initial screen data based on a change of a screen to be displayed at the time of return from the power-saving mode.

* * * * *